US012634278B2

(12) United States Patent
Kim et al.

(10) Patent No.: US 12,634,278 B2
(45) Date of Patent: May 19, 2026

(54) MULTIFACTOR AUTHENTICATION USING INTERNET DOMAIN NAME RETRIEVAL

(71) Applicant: T-Mobile USA, Inc., Bellevue, WA (US)

(72) Inventors: Joohyung Kim, Seattle, WA (US); Chen An Wang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 462 days.

(21) Appl. No.: 18/450,312

(22) Filed: Aug. 15, 2023

(65) Prior Publication Data

US 2025/0063042 A1    Feb. 20, 2025

(51) Int. Cl.
| *H04L 9/40* | (2022.01) |
| *G06V 30/10* | (2022.01) |
| *H04L 51/48* | (2022.01) |
| *H04L 61/4511* | (2022.01) |

(52) U.S. Cl.
CPC .......... H04L 63/0853 (2013.01); G06V 30/10 (2022.01); H04L 51/48 (2022.05); H04L 61/4511 (2022.05); *H04L 2463/082* (2013.01)

(58) Field of Classification Search
CPC . H04L 63/0853; H04L 51/48; H04L 61/4511; H04L 2463/082; G06V 30/10
See application file for complete search history.

(56) References Cited

U.S. PATENT DOCUMENTS

| | | | |
|---|---|---|---|
| 6,396,830 B2 | 5/2002 | Aravamudan et al. | |
| 7,209,931 B2 | 4/2007 | Thambidurai et al. | |
| 7,464,136 B2 | 12/2008 | Lemson et al. | |
| 7,587,491 B2 | 9/2009 | Hinton | |
| 7,707,120 B2 | 4/2010 | Dominguez et al. | |
| 7,970,817 B2 | 6/2011 | Hagiuda et al. | |
| 7,970,940 B1 | 6/2011 | Van et al. | |
| 8,004,491 B2 | 8/2011 | Maynard et al. | |
| 8,078,681 B2 | 12/2011 | Gardner et al. | |
| 8,117,267 B2 | 2/2012 | Gardner et al. | |
| 8,141,134 B2 | 3/2012 | Brandt et al. | |

(Continued)

FOREIGN PATENT DOCUMENTS

| | | |
|---|---|---|
| CN | 101604417 A | 12/2009 |
| CN | 101800735 A | 8/2010 |

(Continued)

*Primary Examiner* — Dhaval V Patel

(74) *Attorney, Agent, or Firm* — Perkins Coie LLP

(57) ABSTRACT

An enrollment system uses a camera to scan an identification document to generate an image. A name of an organization is extracted from the image. The enrollment system obtains one or more Internet domain names associated with the organization. Using a graphical user interface, a prompt is displayed seeking input of an e-mail address of a user of the enrollment system. The input of the e-mail address is received via the graphical user interface. The enrollment system determines that the e-mail address is associated with the one or more Internet domain names. An e-mail is sent to the e-mail address of the user. The enrollment system determines that the user has clicked on a hyperlink in the e-mail using a mobile device that is different from the enrollment system. The enrollment system performs functions to enroll the mobile device in a service plan operated by a mobile network operator.

20 Claims, 6 Drawing Sheets

(56)  References Cited

U.S. PATENT DOCUMENTS

| | | | |
|---|---|---|---|
| 8,296,573 B2 | 10/2012 | Bolle et al. | |
| 8,612,339 B2 | 12/2013 | Rose et al. | |
| 9,065,863 B1 | 6/2015 | Tharakan et al. | |
| 9,137,255 B2 | 9/2015 | Lambert | |
| 9,830,606 B2 | 11/2017 | Boncimino | |
| 9,916,578 B2 | 3/2018 | Dominguez | |
| 10,171,318 B2 | 1/2019 | Pon et al. | |
| 10,645,053 B2 | 5/2020 | Pawar et al. | |
| 10,686,892 B2 | 6/2020 | Negron et al. | |
| 10,891,475 B2 | 1/2021 | Nepomniachtchi et al. | |
| 11,164,156 B1 | 11/2021 | Newman et al. | |
| 11,444,944 B2 | 9/2022 | Konda et al. | |
| 2002/0010604 A1 | 1/2002 | Block | |
| 2002/0184117 A1 | 12/2002 | Provost | |
| 2006/0202012 A1 | 9/2006 | Grano et al. | |
| 2006/0212407 A1 | 9/2006 | Lyon | |
| 2006/0277043 A1 | 12/2006 | Tomes et al. | |
| 2007/0266141 A1 | 11/2007 | Norton | |
| 2011/0086616 A1 | 4/2011 | Brand et al. | |
| 2012/0066105 A1 | 3/2012 | Oneill | |
| 2012/0072550 A1 | 3/2012 | Anufrieva | |
| 2013/0031000 A1 | 1/2013 | Morris | |
| 2015/0161723 A1 | 6/2015 | Rose et al. | |
| 2016/0269411 A1* | 9/2016 | Malachi | H04L 63/0421 |
| 2020/0366671 A1* | 11/2020 | Larson | G06F 9/451 |
| 2022/0358194 A1* | 11/2022 | Gnanasekaran | H04L 63/0861 |
| 2023/0025486 A1* | 1/2023 | Shenoy | H04L 63/0272 |

FOREIGN PATENT DOCUMENTS

| | | | |
|---|---|---|---|
| CN | 102542473 A | 7/2012 | |
| CN | 105279717 A | 1/2016 | |
| CN | 105516192 B | 11/2018 | |
| EP | 1142286 B1 | 4/2006 | |
| EP | 1790150 A1 | 5/2007 | |
| EP | 1788770 B1 | 4/2009 | |
| EP | 2092685 A1 | 8/2009 | |
| EP | 2171911 A2 | 4/2010 | |
| EP | 1929722 B1 | 5/2010 | |
| EP | 1929726 B1 | 8/2010 | |
| EP | 2263365 A1 | 12/2010 | |
| EP | 2965250 A1 | 1/2016 | |
| JP | 2004240938 A | 8/2004 | |
| JP | 2009518751 A | 5/2009 | |
| JP | 2009211110 A | 9/2009 | |
| KR | 20010000916 A | 1/2001 | |
| KR | 20010104567 A | 11/2001 | |
| KR | 20110090240 A | 8/2011 | |
| KR | 20130026002 B | 3/2013 | |
| KR | 20160103146 A | 8/2016 | |
| WO | 0007087 A1 | 2/2000 | |
| WO | 0022543 A1 | 4/2000 | |
| WO | 0177873 A2 | 10/2001 | |
| WO | 0229595 A1 | 4/2002 | |
| WO | 0235436 A1 | 5/2002 | |
| WO | 03054667 A2 | 7/2003 | |
| WO | 03098959 A1 | 11/2003 | |
| WO | 2004013722 A2 | 2/2004 | |
| WO | 2006130958 A1 | 12/2006 | |
| WO | 2009017910 A2 | 2/2009 | |
| WO | 2010095867 A2 | 8/2010 | |
| WO | 2010137816 A2 | 12/2010 | |
| WO | 2011035549 A1 | 3/2011 | |
| WO | 2011137558 A1 | 11/2011 | |
| WO | 2012033563 A1 | 3/2012 | |
| WO | 2012119445 A1 | 9/2012 | |
| WO | 2018126177 A1 | 7/2018 | |
| WO | 2019046406 A1 | 3/2019 | |
| WO | 2020212924 A2 | 10/2020 | |

* cited by examiner

MULTIFACTOR AUTHENTICATION USING INTERNET DOMAIN NAME RETRIEVAL

BACKGROUND

Authentication refers to the act of proving an assertion, such as the identity of a computer system user. Authentication can include validating personal identity documents to verify an identity of a holder of the personal identity documents. With advances in computer and electronic technology, multi-factor authentication methods that have grown popular include electronic authentication methods in which a user is granted access to a website or computer application only after successfully presenting two or more pieces of evidence to an authentication mechanism. However, existing multifactor authentication systems can experience security issues resulting from leaked user credentials on the Web or recycled phone numbers that match existing user accounts. Moreover, short message service (SMS) texts used in conventional text-based authentication methods can be intercepted by malicious entities using specialized wireless systems or phishing tools.

BRIEF DESCRIPTION OF THE DRAWINGS

Detailed descriptions of implementations of the present technology will be described and explained through the use of the accompanying drawings.

Figure 1:
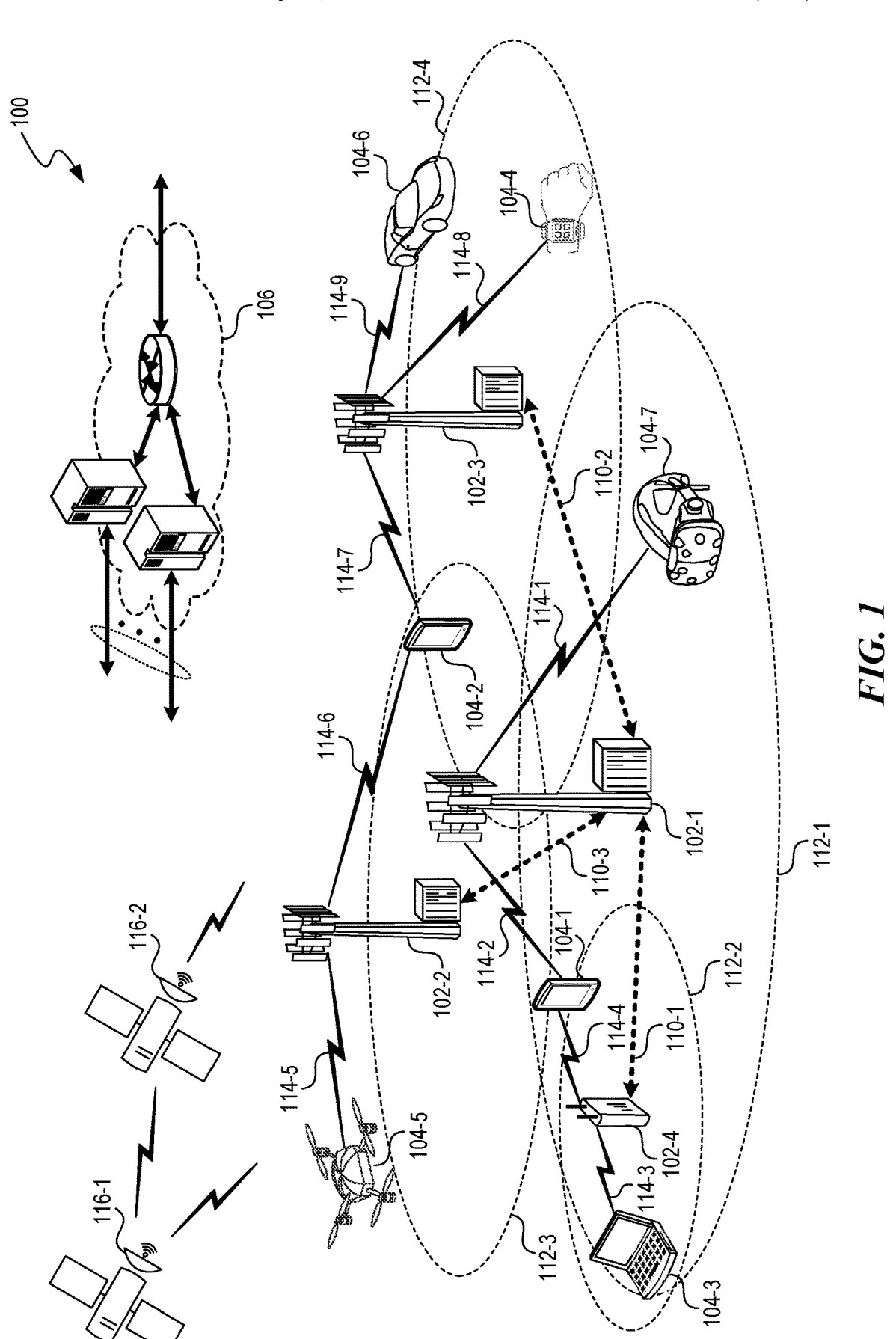
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Authentication of the identity of an individual by a server or client can be performed using a username and password. Other ways to authenticate can use identification cards, retina scans, voice recognition, and fingerprints. Conventional authentication methods often require a user or customer to present the identity by which the user is known to the authentication system, along with evidence of the authenticity of the user's claim to that identity. Simple authentication typically uses evidence, such a password. For additional security, multifactor authentication or two-factor authentication is used, requiring two pieces of evidence to be supplied.

The use of multiple authentication factors to prove a identity is based on the premise that an unauthorized actor is unlikely to be able to supply the factors required for access. If, in an authentication attempt, at least one of the components is missing or supplied incorrectly, the user's identity is not established with sufficient certainty and access to the asset (e.g., a building or data) being protected by multi-factor authentication remains blocked. The authentication factors of a conventional multifactor authentication scheme may include a security token (e.g., USB stick), a bank card, a key, a password, a personal identification number (PIN), a Personal Unlocking Key (PUK), or biometrics, such as a fingerprint, eye iris, voice, typing speed, or pattern in key press intervals. However, when an individual seeking authentication of their identity is an international student, expatriate traveler, or short- or long-term traveler, none of the evidence described above may have been previously entered into an authentication or device enrollment system. An international student or traveler seeking enrollment into a post-paid cellular service plan may at best possess an unsecured document, such as a student visa, an international driver's license, or a letter of reference whose authenticity cannot be verified locally using traditional methods. There is thus a need for improved methods for multifactor authentication using identification documents, for example, to enroll an existing mobile device of an international student or traveler into a post-paid cellular service plan by a mobile network operator.

This document discloses methods, systems, and apparatuses for multifactor authentication using identification documents, which may be secured or unsecured, to address the challenges posed by verifying identity of international students, expatriates, or long-term travelers that have no verified identification. The disclosed technology applies authentication, Internet domain name matching, and machine learning techniques to verification of individual identities using retrieval of Internet domain names associated with the individual. Particular implementations can be used to verify the identity of and on-board new customers who have no social security number or credit score. In such implementations, an enrollment system scans an identification document, such as a student visa issued by a government, performs optical character recognition to determine an academic institution referenced by the student visa, and determines one or more Internet domain names used by the academic institution. An e-mail address of the new customer is verified against the one or more Internet domain names. The enrollment system sends an e-mail to the new customer with a prompt to click on a clickable verification link in the e-mail using their existing mobile device, which may be operating on a different mobile network. In response to determining that the new customer has clicked the verification hyperlink, the enrollment system enrolls the new customer or mobile device in a service plan operated by a mobile network operator associated with the enrollment system. Note that while some embodiments of the technology disclosed herein describe enrollment of a customer into a cellular service plan, implementations of this technology can be used for applications such as checking a customer into a hotel, enrolling a student into a university, any other application for determining authenticity of users using Internet domain name retrieval, or a combination thereof.

In some implementations, an enrollment system validates an identification document presented by a new customer who wishes to enroll their existing mobile device in a cellular service plan. The enrollment system scans the document using a camera. The document can be a student visa, a letter of reference, or an international driver's license. A name of an organization displayed by the scan is extracted. The organization can be a university, a company, a government department, etc. The enrollment system retrieves one or more Internet domain names associated with the organization from a computer server. The enrollment system displays a prompt seeking input of an e-mail address from the customer. The e-mail address is associated with a particular Internet domain name. The enrollment system determines that the particular Internet domain name matches the Internet domain name(s) associated with the organization. In response to determining that the particular Internet domain name matches, the enrollment system sends an e-mail to the e-mail address of the new customer. The e-mail includes a clickable hyperlink. After the new customer clicks the hyperlink using their mobile device, the enrollment system performs functions to enroll the mobile device in a service plan operated by a mobile network operator associated with the enrollment system.

In some instances, a new customer having an identification document visits a store offering post-paid cellular plans and mobile devices. The customer wishes to obtain a new post-paid cellular account as well as a new mobile device, or add a new device to an existing mobile account. In such instances, a computer system at the store can scan the identification document to generate an image of the identification document. The system determines a name of an organization displayed by the image. From a computer server, one or more Internet domain names associated with the organization are obtained. The system displays a prompt for input from the customer. The input entered by the customer includes an e-mail address of the customer. The system determines that the e-mail address is associated with the one or more Internet domain names. An e-mail is sent to the e-mail address of the customer. If the customer does not have a functioning mobile device with them in the store that they can use to access e-mail, they can visit an Internet café or return home and read the e-mail on an electronic device. When the system determines that the customer later clicked on a hyperlink included in the e-mail, the user is enrolled in the new post-paid cellular account. The customer can be mailed a new mobile device associated with the post-paid cellular account if desired.

In some instances, enrollment in a service plan is performed remotely over the Internet. For example, a computer system that performs the enrollment receives an image of an identification document that has been scanned remotely. The computer system causes a prompt to be displayed on a screen of an electronic device, e.g., that is accessing an enrollment website. From the electronic device, an e-mail address associated with a new customer is received. The computer system obtains a name of an organization from the image. Based on the name of the organization, one or more Internet domain names associated with the organization are retrieved from a computer server. The computer system determines that the e-mail address is associated with the one or more Internet domain names. The computer system sends an e-mail including a clickable link to the e-mail address. Once the link in the e-mail has been clicked, the computer system sends a message to the computer server authenticating an identity of the user for the enrollment.

The benefits and advantages of the implementations described herein include secure authentication and verification of identities obviating the need for existing usernames, passwords, or biomarker scanning. By avoiding the collection of retina scans, voice recognition, and fingerprints, the disclosed methods protect customer privacy and reduce leaks of security information. The disclosed systems establish a user's identity with sufficient certainty based on identification documents. Furthermore, no security tokens, bank cards, keys, personal identification numbers (PINs), Personal Unlocking Keys (PUKs), or biometrics are needed. The disclosed apparatuses are especially useful to verify the identity of international students, expatriate travelers, or short- or long-term travelers, who may not have had identifying information previously entered into an authentication or device enrollment system. For example, using the disclosed implementations, an international student or traveler can be enrolled into a post-paid cellular service plan and can avoid the extra cost of a pre-paid plan. In addition, by using machine learning architectures, such as convolutional neural networks (CNNs), which use shared weights in convolutional layers, the disclosed implementations enable reduction of memory footprint and improvement in computational performance for determining organizational names displayed by scanned images.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed d throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
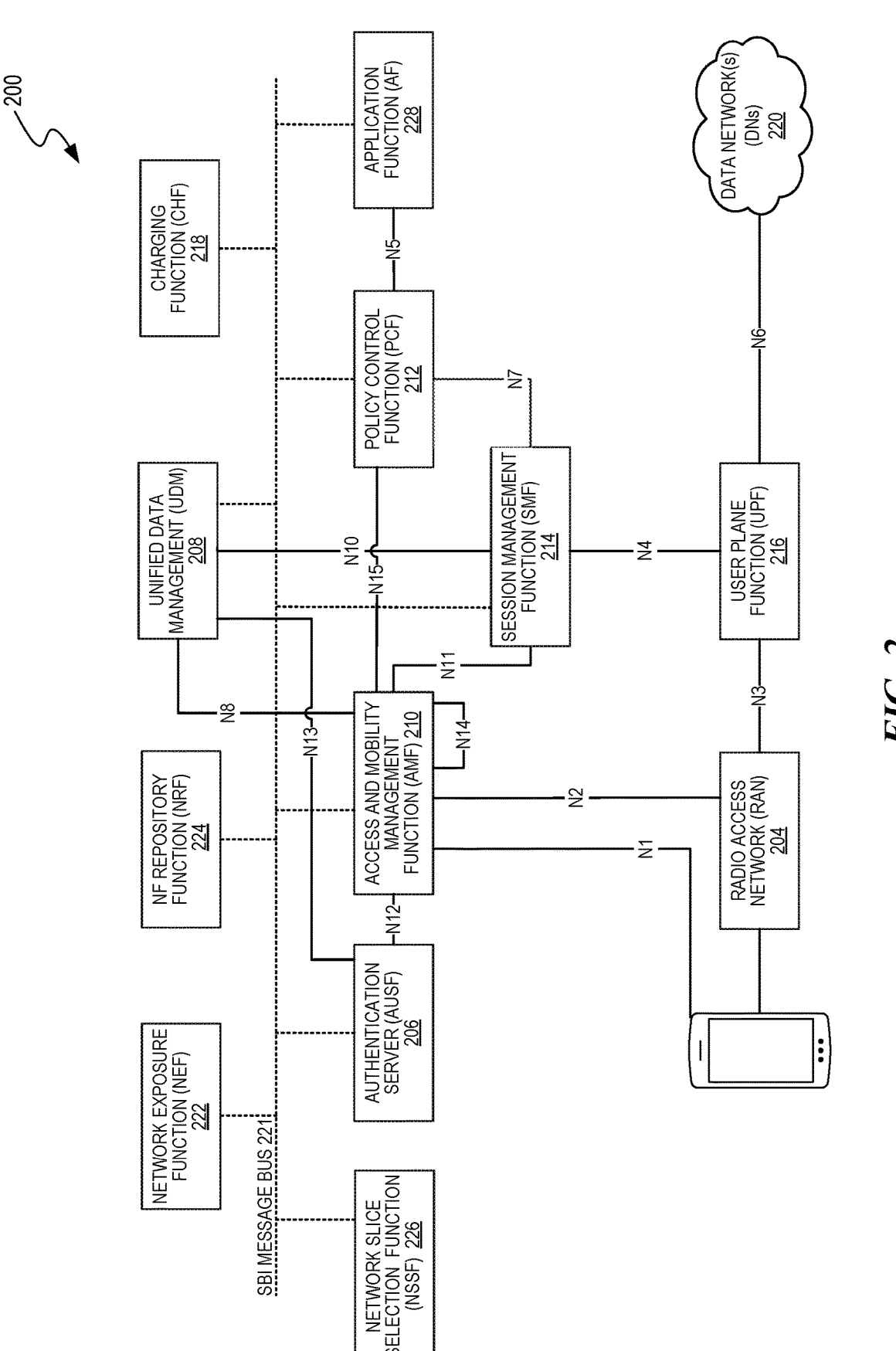
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNS) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Multifactor Authentication Using Internet Domain Name Retrieval

Figure 3:
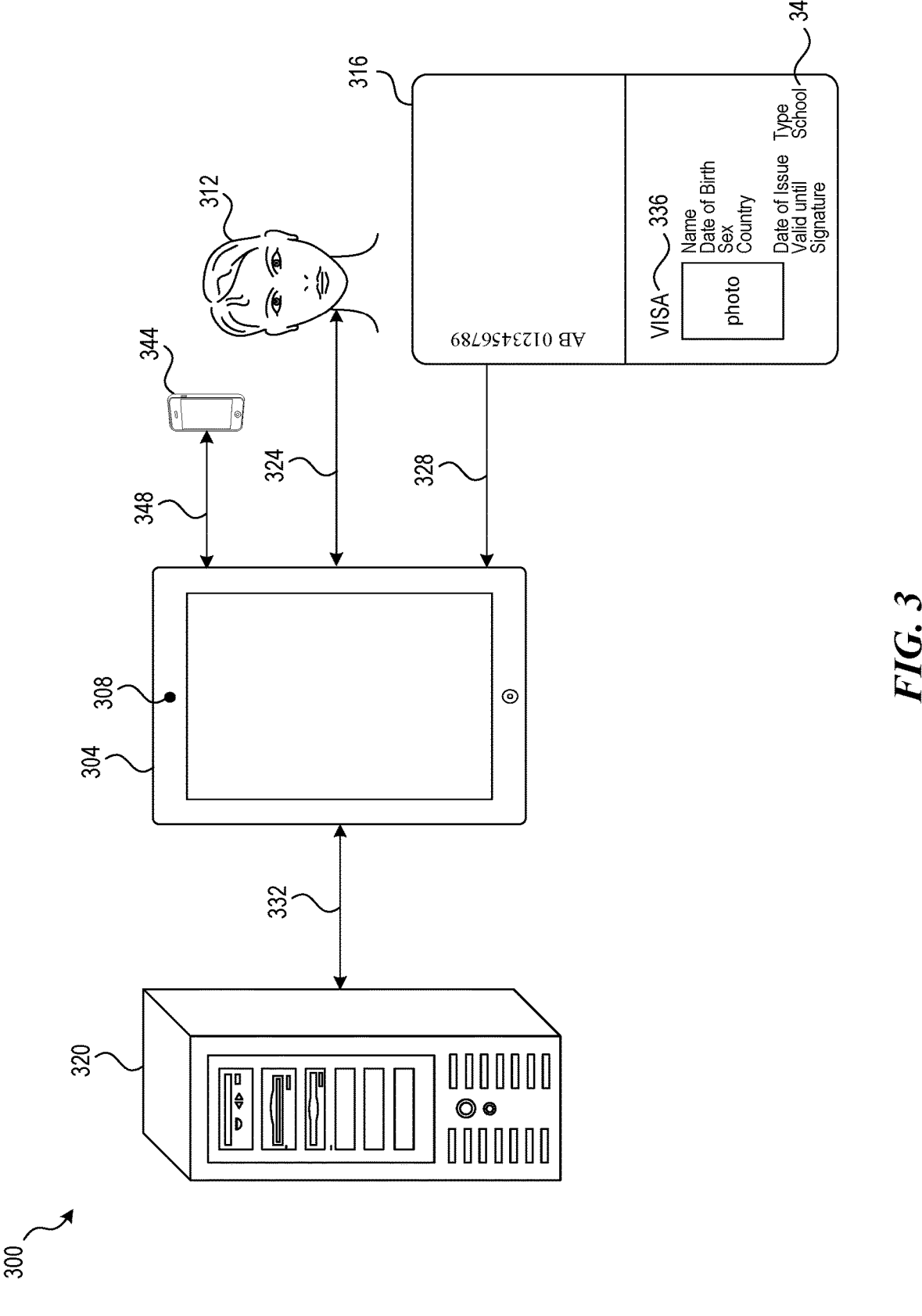
FIG. 3 is a drawing that illustrates an example environment for multifactor authentication using Internet domain name retrieval.

FIG. 3 is a drawing that illustrates an example environment 300 for multifactor authentication using Internet domain name retrieval. Environment 300 includes electronic device 304, computer server 320, mobile device 344, and identification document 316. Electronic device 304 is a laptop, desktop, or a mobile device similar to wireless devices 104-1 through 104-7, illustrated and described in more detail with reference to FIG. 1. Mobile device 344 is the same as or similar to wireless devices 104-1 through 104-7. Mobile device 344 operates on a cellular network similar to network 100 illustrated and described in more detail with reference to FIG. 1. Electronic device 304 and computer server 320 typically have wired connections to the Internet. In some implementations, electronic device 304 and/or computer server 320 are connected to a cellular network similar to network 100. Electronic device 304, computer server 320, and mobile device 344 are implemented using components of example computer system 600 illustrated and described in more detail with reference to FIG. 6. Likewise, embodiments of example environment 300 can include different and/or additional components or can be connected in different ways.

Identification document 316 can be a secured document or an unsecured document. A secured document typically refers to a document issued by a state or national government of a country in which it is being presented for authentication. For example, a social security card, a passport, or a driver's license would be a secured document if presented in the issuing country or state because it can typically be locally verified by accessing a database. An unsecured document refers to a document issued by a foreign government or by a government to a person whose identify cannot readily be locally verified. For example, a student visa issued by the United States (U.S.) government to a foreign student who does not have a U.S. social security number is an unsecured identification document. Other examples of unsecured identification documents are letters of reference and foreign passports.

Described herein are implementations of enrollment systems used to authenticate the identity of users or new customers. For example, an enrollment system is implemented using electronic device 304 to authenticate an identity of user 312 (e.g., a new customer). The terms "Customer" and "user" are used interchangeably herein. For instance, a new customer may walk into a store to enroll themselves or their existing mobile device 344 into a postpaid cellular plan. In other instances, the user 312 can perform a portion of the enrollment process in-store and return home to perform a remaining portion remotely. In other instances, user 312 can perform the enrollment process remotely.

Identification document 316 is presented by user 312 for enrollment. An enrollment system can use a built-in or embedded camera 308 or an external camera (such as a webcam) to scan identification document 316 presented by user 312. Identification document 316 can be a foreign passport including a visa 336 stamped on the passport. Electronic device 304, or software running on a cloud server connected to electronic device 304, generates image 328 of scanned identification document 316. For example, electronic device 304 is connected to a software enrollment system executing on computer server 320. In such an example, computer server 320 includes computer hardware or software that provides functionality for other programs or devices (e.g., electronic device 304), called "clients." In some instances in which user 312 is performing enrollment remotely, an enrollment system receives image 328 of identification document 316 over the Internet from the user 312, e.g., from mobile device 344 or another computer device operated by user 312.

In some implementations, an enrollment system uses an image scanner instead of camera 308 to optically scan visa 336 and convert it into a digital image. The scanner can be a desktop flatbed scanner where identification document 316 is placed on a glass window for scanning. A hand-held scanner, where the device is moved by hand, can also be used. In some examples, a digital camera can be used for the same purpose. Digital cameras offer advantages of speed, portability and non-contact digitizing of identification document 316. The image 328 can be downloaded by electronic device 304 or stored on standalone flash media (e.g., memory cards or USB sticks).

An enrollment system, such as running on a cloud server connected to electronic device 304, determines a name 340 of an organization displayed by image 328. For example, name 340 is "Stanford Law School," "Duke University," or "Department of Agriculture." Optical character recognition, machine learning, look-up tables, database searches, or other methods can be used to determine the name 340 of the organization. In some embodiments, to determine the name of the organization, a feature vector is extracted from image 328. Feature extraction is illustrated and described in more detail with reference to FIG. 5. For example, the features can include shapes, edges, or letters extracted from image 328. The enrollment system can use a machine learning model (ML) to determine the name of the organization based on the feature vector. For example, the ML model is trained to determine organizational names displayed by training images. Example machine learning methods and training of ML models is described in more detail with reference to FIG. 5.

In some implementations, the enrollment system obtains one or more Internet domain names associated with the organization from computer server 320 based on the name 340 of the organization. The data 332 includes the name 340 of the organization and the one or more Internet domain names retrieved. Each of the one or more Internet domain names is a string that identifies a realm of administrative autonomy, authority or control exercised by the organization. The one or more Internet domain names are used to identify services provided through the Internet, such as websites, email services and more. In general, each domain name identifies a network domain administered by the organization. Internet domain names for different organizations can be stored on computer server 320 in a database, data structure, linked list, look-up table, tree, etc.

In some implementations, the enrollment system obtains the one or more Internet domain names associated with the organization from a domain name registrar server. For example, a domain name registrar server offers domain registration, Domain Name System (DNS) hosting, dynamic DNS, domain forwarding, and email forwarding. A domain name registrar server can provide one-click DNS configuration that connects the domains with Websites of the organization. A domain name registrar server can support domain privacy, custom nameservers, and Domain Name System Security Extensions (DNSSEC).

In response to receiving the image 328, the enrollment system causes a prompt for input from user 312 to be displayed to the user 312. In scenarios where user 312 is in a store in proximity to electronic device 304, the prompt is displayed on a screen of electronic device 304 or is cast to a screen of mobile device 344. In scenarios where the user 312 is performing the enrollment process remotely, the prompt is displayed on a screen of mobile device 344 or another computer device operated by user 312. The data 324 includes the prompt and input from user 312. The prompt requests user 312 to enter their e-mail address (at the organization). In some implementations, the enrollment system uses a generative artificial intelligence model to generate the prompt for the input from the user. The generation of the prompt is based on the image 328 or the name of the organization displayed by image 328. Generative artificial intelligence models are described in more detail with reference to FIG. 5. The purpose of requesting the e-mail address is to determine whether the user 312 is associated with the organization. User 312 types or keys in their e-mail address as input to electronic device 304. In some instances, if user 312 is performing the enrollment process remotely using a Web interface, they may enter their e-mail address on mobile device 344 or another computer device in their possession.

The enrollment system receives the input including the e-mail address of user 312. The enrollment system determines that the e-mail address is associated with the one or more Internet domain names. For example, string matching, table look-up, or other comparison methods can be used. The enrollment system sends an e-mail to the e-mail address of the user 312. In some instances, user 312 (if they don't have an existing mobile device or if they don't have mobile device 344 in their possession in the store) can leave the store and return home to access the e-mail on another electronic device or computer. The e-mail from the enrollment system includes a clickable hyperlink.

The enrollment system determines that the hyperlink in the e-mail has been clicked on another electronic device (e.g., mobile device 344). For example, after the user 312 clicks the link, an IP address associated with the domain name of the link is resolved. By clicking the link, the other electronic device sends an acknowledgement message to electronic device 304. A success message can also be displayed on either or both of electronic device 304 or the other electronic device. The data 348 can include the e-mail or information describing that the link has been clicked.

In response to determining that the link has been clicked, the enrollment system performs functions to enroll at least one of the user 312, an electronic device of the user 312, or the mobile device 344 in a service plan operated by a mobile network operator associated with the enrollment system. In some implementations, the functions to enroll the user in the service plan include sending a message to a computer server operated by the mobile network operator. For example, software operating on the computer server performs the remainder of the enrollment, payment, etc. In some embodiments, the enrollment system (e.g., operating on electronic device 304) sends a message authenticating an identity of the user 312 to the computer server 320. A new mobile device enrolled in the service plan may also be provided to the user 312 as part of the service plan.

Figure 4:
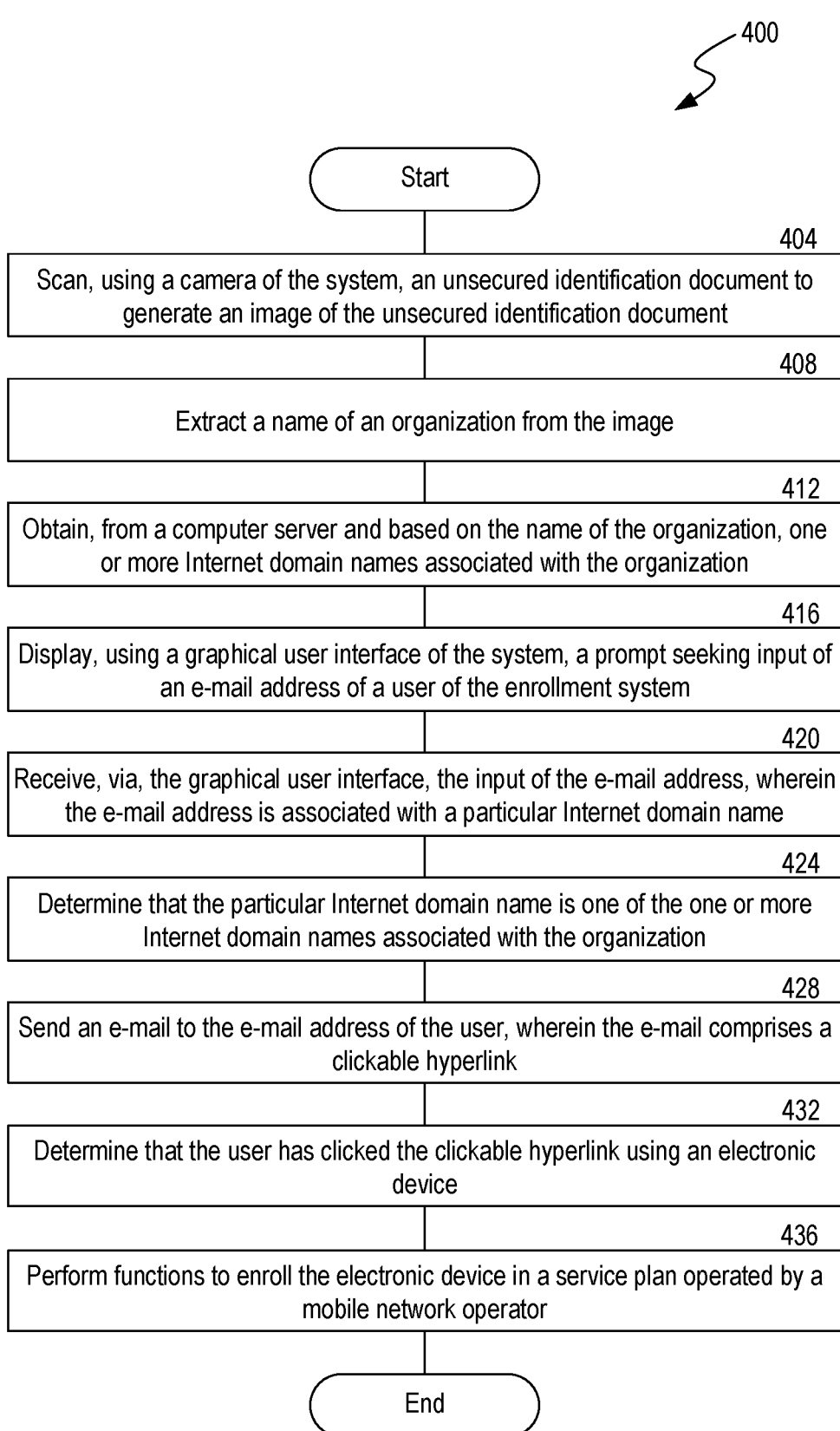
FIG. 4 is a flowchart that illustrates an example process for multifactor authentication using Internet domain name retrieval.

FIG. 4 is a flowchart that illustrates an example process 400 for multifactor authentication using identification documents. In some implementations, the process is performed by electronic device 304 illustrated and described in more detail with reference to FIG. 3. In some implementations, the process is performed by a computer system, e.g., example computer system 600 illustrated and described in more detail with reference to FIG. 6. Particular entities, for example, computer server 320 or mobile device 344 perform some or all of the steps of the process in other implementations. Computer server 320 and mobile device 344 are illustrated and described in more detail with reference to FIG. 3. Likewise, implementations can include different and/or additional steps or can perform the steps in different orders.

In act 404, an enrollment system scans an identification document to generate an image of the identification document using a camera of the enrollment system. The enrollment system can be implemented on computer device 304 illustrated and described in more detail with reference to FIG. 3. In some embodiments, the enrollment system is implemented on computer server 320 or a cloud server operated by a mobile network operator associated with the enrollment system. A mobile network operator (MNO), also known as a wireless service provider, wireless carrier, cellular company, or mobile network carrier, typically refers to a provider of wireless communications services that owns or controls all the elements necessary to sell and deliver services to an end user, including radio spectrum allocation, wireless network infrastructure, back haul infrastructure, billing, customer care, provisioning computer systems, and marketing and repair organizations.

The enrollment system can include software, instructions and applications to perform some of the functions described herein. The identification document scanned is similar to or the same as identification document 316 illustrated and described in more detail with reference to FIG. 3. The image is similar to or the same as image 328 illustrated and described in more detail with reference to FIG. 3. In some embodiments, the identification document is unsecured. The camera used is similar to or the same as camera 308 illustrated and described in more detail with reference to FIG. 3.

In act 408, the enrollment system extracts a name of an organization from the image. The organization can be a university, a college, a company, a government department, an agency, a law firm, etc. In some implementations, the enrollment system extracts the name of the organization by performing optical character recognition on the image to identify text within the image. For example, the enrollment system performs electronic conversion of typed, handwritten, or printed text in the scanned image into machine-encoded text. The name of the organization is obtained from the machine-encoded text. In some instances, machine learning, Web search, or looking up a table or other data stored in the enrollment system or on a computer server is used to identify the portion of the machine-encoded text that matches the name of the organization.

In act 412, the enrollment system obtains one or more Internet domain names associated with the organization from a computer server based on the name of the organization. Computer server 320 or a cloud server operated by a mobile network operator can be used. In some implementations, the enrollment system obtains the one or more Internet domain names associated with the organization from a domain name registrar server. For example, a domain name registrar server offers domain registration, Domain Name System (DNS) hosting, dynamic DNS, domain forwarding, and email forwarding. A domain name registrar server can provide one-click DNS configuration that connects the domains with Websites of the organization. A domain name registrar server can support domain privacy, custom nameservers, and Domain Name System Security Extensions (DNSSEC).

In act 416, the enrollment system displays a prompt seeking input of an e-mail address of a user of the enrollment system. The prompt is displaced using a graphical user interface of the enrollment system. For example, the prompt is "Please enter your e-mail address" displayed on a screen of electronic device 304 using a graphical user interface or a Webpage to enroll the user or a new customer that is displayed on electronic device 304.

In act 420, the enrollment system receives the input of the e-mail address by the user via, the graphical user interface. For example, the user enters their e-mail address into a physical or virtual keypad of electronic device 304. The enrollment system determines that the e-mail address is associated with a particular Internet domain name. For example, the enrollment system discards a local-part (sometimes a user name, but not always) and uses the domain name part of the e-mail address to look up a mail exchange IP address. An SMTP client can be used to send a message to the mail exchange for verification. In some embodiments, the enrollment system uses a mail user agent (MUA) or mail transfer agent (MTA) and DNS to look up a Resource Record (RR) for the particular Internet domain name. A mail exchanger resource record (MX record) contains the name of the organization's mail server. In absence of an MX record, an address record (A or AAAA) directly specifies the mail host.

In act 424, the enrollment system determines that the particular Internet domain name is one of the one or more Internet domain names associated with the organization. In some implementations, string matching is used to perform the determination. For example, the enrollment system compares the particular Internet domain name pattern with text in the one or more Internet domain names obtained from the computer server. The letters in the pattern can be matched to corresponding subsequences in the one or more Internet domain names. In some embodiments, approximate string matching (sometimes referred to as fuzzy string searching) is used. In such embodiments, the enrollment system finds strings that match a pattern approximately (rather than exactly). For example, the enrollment system finds approximate substring matches inside the one or more Internet domain names associated with the organization and finds dictionary strings that match the pattern approximately.

In act 428, in response to determining that the particular Internet domain name is one of the one or more Internet domain names, the enrollment system sends an e-mail to the e-mail address of the user. The e-mail includes a hyperlink that is clickable by the user to continue the enrollment process.

In act 432, the enrollment system determines that the user has clicked the clickable hyperlink using an electronic device or mobile device that is different from the enrollment system. For example, the user uses mobile device 344. The enrollment system is not used for clicking of the hyperlink because the enrollment system is attempting to authenticate the user's identity and verify that the e-mail address of the user exists and is associated with the user and the organization that the identification document is associated with.

In some implementations, the enrollment system and the mobile device communicate via short range wireless communication. Short range wireless communication technology is used to communicate wirelessly over shorter distances, such as a few millimeters to several meters. Short range wireless communication technology includes near field communication (NFC), Zigbee, Bluetooth, Wi-Fi, radio frequency identification (RFID), Z-wave, infrared (IR) wireless, and equivalents. Other types of short range wireless communication such as 3.84 MHz wireless and minimum-shift keying (MSK) can also be used.

NFC is a set of communication protocols for communication between two electronic devices over a distance of 4 cm or less. NFC devices can act as electronic identity documents or keycards. NFC is based on inductive coupling between two antennas present on NFC-enabled devices—for example a smartphone and an NFC card-communicating in one or both directions, using a frequency of 13.56 MHz in the globally available unlicensed radio frequency ISM band using the ISO/IEC 18000-3 air interface standard at data rates ranging from 106 to 424 kbit/s. NFC-enable devices can act like an NFC card, allowing users to perform transactions such as payment or ticketing.

Zigbee is a wireless technology developed as an open global standard to address the unique needs of low-cost, low-power wireless IoT networks. The Zigbee standard operates on the IEEE 802.15.4 physical radio specification and operates in unlicensed bands including 2.4 GHZ, 900 MHz and 868 MHz. Bluetooth technology is a high-speed low powered wireless technology link that is designed to connect phones or other portable equipment together. The Bluetooth specification (IEEE 802.15.1) is for the use of low-power radio communications to link phones, computers, and other network devices over short distances without wires. Wireless signals transmitted with Bluetooth cover short distances, typically up to 30 feet (10 meters). It is achieved by embedded low-cost transceivers into the devices.

Wi-Fi is a family of wireless network protocols, based on the IEEE 802.11 family of standards, which are commonly used for local area networking of devices and Internet access, allowing nearby digital devices to exchange data by radio waves. RFID uses electromagnetic fields to automatically identify and track tags attached to objects. An RFID system consists of a tiny radio transponder, a radio receiver and transmitter. When triggered by an electromagnetic interrogation pulse from a nearby RFID reader device, the tag transmits digital data back to the reader. Passive tags are powered by energy from the RFID reader's interrogating radio waves. Active tags are powered by a battery and thus can be read at a greater range from the RFID reader, up to hundreds of meters.

Z-Wave is a wireless communications protocol on a mesh network using low-energy radio waves to communicate from appliance to appliance, allowing for wireless control of devices. A Z-Wave system can be controlled via the Internet from a smart phone, tablet, or computer, and locally through a smart speaker, wireless key fob, or wall-mounted panel. IR wireless is the use of wireless technology in devices or systems that convey data through infrared (IR) radiation. Infrared is electromagnetic energy at a wavelength or wavelengths somewhat longer than those of red light. The shortest-wavelength IR borders visible red in the electromagnetic radiation spectrum; the longest-wavelength IR borders radio waves. In some embodiments, the enrollment system and the mobile device communicate via EMV (a technology based upon a technical standard for smart payment cards named for "Europay, Mastercard, and Visa").

In some embodiments, the enrollment system is operating on a first telecommunications network operated by a first mobile network operator. For example, electronic device 304 is located in a store operated by the first mobile network operator. The mobile device (e.g., mobile device 344) brought into the store by a new customer is operating on a second telecommunications network different from the first telecommunications network. The first and second telecommunications networks are similar to network 100 illustrated and described in more detail with reference to FIG. 1. For example, the second telecommunications network is a network operated by another carrier that the user (e.g., an international student) already has a cellular plan with. To receive the e-mail and click the hyperlink on the mobile device, the mobile device connects with the second telecommunications network. In some implementations, the enrollment system is operating on a particular telecommunications network and the mobile device is roaming on the particular telecommunications network. For example, the mobile device is previously enrolled with another carrier that operates another network. When the user walks into the store, the mobile device is travelling outside the geographical coverage area of the other (home) network. The mobile device automatically hops onto the particular telecommunications network.

In act 436, in response to determining that the user has clicked the clickable hyperlink, the enrollment system performs functions to enroll the mobile device in a service plan operated by a mobile network operator associated with the enrollment system. For example, the user is prompted to enter further biographical details or payment information into the enrollment system. The embodiments disclosed herein are especially beneficial to international visitors, students, and travelers, when the service plan is a post-paid service plan. Prepaid connections require payment before service and are typically more expensive per minute than post-paid connections. Post-paid plans require no upfront payment and can be preferable for users with fixed salaries because they can easily pay their post-paid bills once their salaries are credited to their account.

Post-paid connections are useful for users who require a consistent contract with their cellular providers and do not want to top up on a regular basis. Another advantage of having a post-paid connection is that some of the plans offer free Over-the-Top (OTT) platform subscriptions. OTT refers to content providers that deliver media directly over the Internet to users without the need for traditional cable or satellite TV services. Other advantages of post-paid service plans include the fact that users do not need to top-up even if they have used up their allotted data or calling minutes.

In some embodiments, the functions to enroll the mobile device in a service plan include programming an embedded Subscriber Identity Module (eSIM) card of the mobile device by the enrollment system using the computer server or a cloud server. The eSIM card loads carrier information onto the mobile device without using an external physical chip. The eSIM is a microchip embedded inside the mobile device and can download carrier data remotely, enabling the user to switch carriers on the spot.

If the mobile device has a physical SIM tray and an eSIM, the user can actively use multiple lines at the same time. The functions to enroll the mobile device in a service plan can include toggling different carriers on and off. In some embodiments, the service plan is a first service plan offered by a first mobile network operator. Prior to being enrolled in the first service plan, the mobile device was already enrolled in a second service plan operated by a second mobile network operator. For example, the second mobile network operator operates a network that is the home network of the mobile device.

Figure 5:
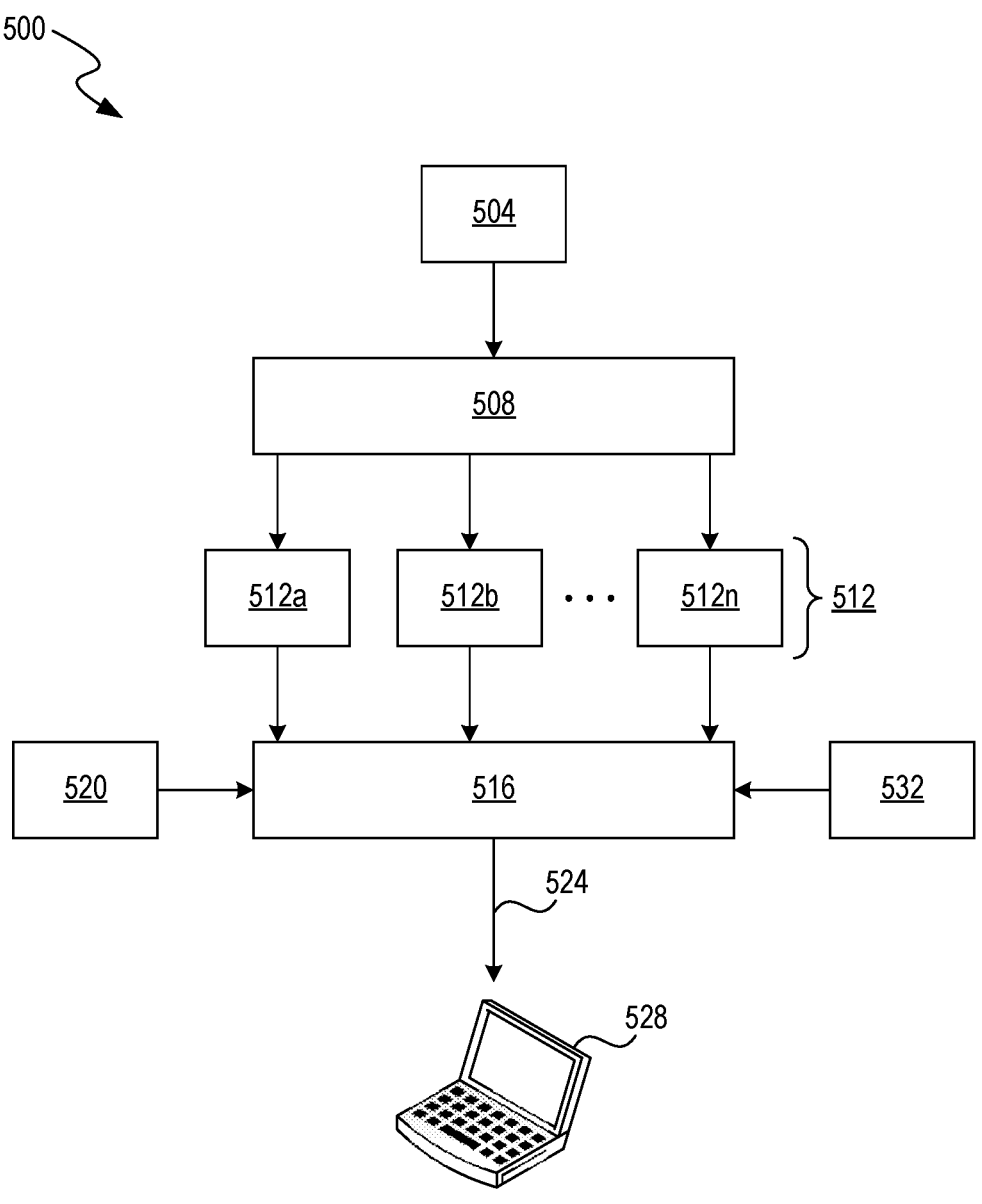
FIG. 5 is a block diagram that illustrates an example machine learning (ML) system that can implement aspects of the present technology.

FIG. 5 is a block diagram that illustrates an example machine learning (ML) system 500 that can implement aspects of the present technology. The ML system 500 is implemented using components of the example computer system 600 illustrated and described in more detail with reference to FIG. 6. For example, the ML system 500 can be implemented on the processor 602 using instructions 608 programmed in the memory 606 illustrated and described in more detail with reference to FIG. 6. Likewise, implementations of the ML system 500 can include different and/or additional components or be connected in different ways. The ML system 500 is sometimes referred to as a ML module.

The ML system 500 includes a feature extraction module 508 implemented using components of the example computer system 600 illustrated and described in more detail with reference to FIG. 6. In some implementations, the feature extraction module 508 extracts a feature vector 512 from input data 504. For example, the input data 504 can be image 328 illustrated and described in more detail with reference to FIG. 3. The feature vector 512 includes features 512a, 512b, . . . , 512n. For example, the feature extraction module 508 extracts a feature vector from image 328.

The feature extraction module 508 reduces the redundancy in the input data 504, e.g., repetitive data values, to transform the input data 504 into the reduced set of features 512, e.g., features 512a, 512b, . . . , 512n. The feature vector 512 contains the relevant information from the input data 504, such that events or data value thresholds of interest can be identified by the ML model 516 by using this reduced representation. In some example implementations, the following dimensionality reduction techniques are used by the feature extraction module 508: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate implementations, the ML model 516 performs deep learning (also known as deep structured learning or hierarchical learning) directly on the input data 504 to learn data representations, as opposed to using task-specific algorithms. In deep learning, no explicit feature extraction is performed; the features 512 are implicitly extracted by the ML system 500. For example, the ML model 516 can use a cascade of multiple layers of nonlinear processing units for implicit feature extraction and transformation. Each successive layer uses the output from the previous layer as input. The ML model 516 can thus learn in supervised (e.g., classification) and/or unsupervised (e.g., pattern analysis) modes. The ML model 516 can learn multiple levels of representations that correspond to different levels of abstraction, wherein the different levels form a hierarchy of concepts. In this manner, the ML model 516 can be configured to differentiate features of interest from background features.

The output 524 is provided to the computer device 528, or the computer server 320 or computer device 304 illustrated and described in more detail with reference to FIG. 3. The computer device 528 is a server, computer, tablet, smartphone, smart speaker, etc., implemented using components of the example computer system 600 illustrated and described in more detail with reference to FIG. 6. In some implementations, the steps performed by the ML system 500 are stored in memory on the computer device 528 for execution. In other implementations, the output 524 is displayed on the display device 618 illustrated and described in more detail with reference to FIG. 6.

In alternative example implementations, the ML model 516, e.g., in the form of a CNN generates the output 524, without the need for feature extraction, directly from the input data 504. For example, the output 524 is an organizational name extracted from an identification document.

The ML model 516 can be a CNN that includes both convolutional layers and max pooling layers. A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing. The architecture of the ML model 516 can be "fully convolutional," which means that variable-sized test location data vectors can be fed into it. For all convolutional layers, the ML model 516 can specify a kernel size, a stride of the convolution, and an amount of zero padding applied to the input of that layer. For the pooling layers, the ML model 516 can specify the kernel size and stride of the pooling.

In some implementations, the ML system 500 trains the ML model 516, based on the training data 520, to correlate the feature vector 512 to expected outputs in the training data 520. For example, the ML model 516 is trained to determine organizational names displayed by training images, as described in more detail with reference to FIG. 3. As part of the training of the ML model 516, the ML system 500 forms a training set of features and training labels by identifying a positive training set of features that have been determined to have a desired property in question, and, in some implementations, forms a negative training set of features that lack the property in question.

The ML system 500 applies ML techniques to train the ML model 516, that when applied to the feature vector 512, outputs indications of whether the feature vector 512 has an associated desired property or properties, such as a probability that the feature vector 512 has a particular Boolean property, or an estimated value of a scalar property. The ML system 500 can further apply dimensionality reduction (e.g., via linear discriminant analysis (LDA), PCA, or the like) to reduce the amount of data in the feature vector 512 to a smaller, more representative set of data.

The ML system 500 can use supervised ML to train the ML model 516, with feature vectors of the positive training set and the negative training set serving as the inputs. In some implementations, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example implementations, a validation set 532 is formed of additional features, other than those in the training data 520, which have already been determined to have or to lack the property in question. The ML system 500 applies the trained ML model 516 to the features of the validation set 532 to quantify the accuracy of the ML model 516. Common metrics applied in accuracy measurement include: Precision and Recall, where Precision refers to a number of results the ML model 516 correctly predicted out of the total it predicted, and Recall is a number of results the ML model 516 correctly predicted out of the total number of features that had the desired property in question. In some implementations, the ML system 500 iteratively re-trains the ML model 516 until the occurrence of a stopping condition, such as the accuracy measurement indication that the ML model 516 is sufficiently accurate, or a number of training rounds having taken place. The validation set 532 can include determined organizational names and training images. This allows the detected values to be validated using the validation set 532. The validation set 532 can be generated based on analysis to be performed.

In some embodiments, ML system 500 is a generative artificial intelligence or generative AI system capable of generating text, images, or other media in response to prompts. Generative AI systems use generative models such as large language models to produce data based on the training data set that was used to create them. A generative AI system is constructed by applying unsupervised or self-supervised machine learning to a data set. The capabilities of a generative AI system depend on the modality or type of the data set used. For example, generative AI systems trained on words or word tokens are capable of natural language processing, machine translation, and natural language generation and can be used as foundation models for other tasks. In addition to natural language text, large language models can be trained on programming language text, allowing them to generate source code for new computer programs. Generative AI systems trained on sets of images with text captions are used for text-to-image generation and neural style transfer.

Computer System

Figure 6:
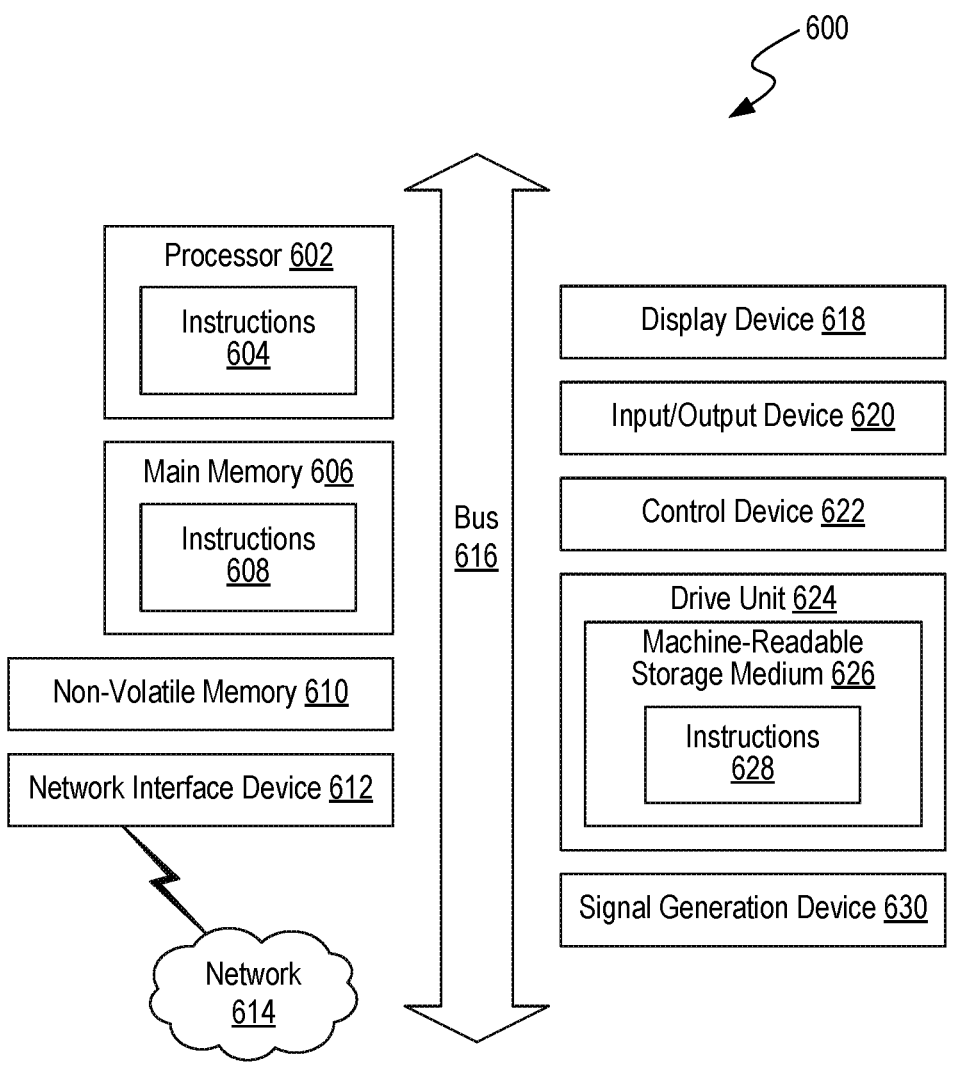
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following examples should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. An enrollment system comprising:

at least one hardware processor; and at least one non-transitory memory storing instructions, which, when executed by the at least one hardware processor, cause the enrollment system to:

scan, using a camera of the enrollment system, an identification document to generate an image of the identification document;

extract a name of an organization from the image;

obtain, from a computer server and based on the name of the organization, one or more Internet domain names associated with the organization;

display, using a graphical user interface of the enrollment system, a prompt seeking input of an e-mail address of a user of the enrollment system;

receive, via, the graphical user interface, the input of the e-mail address, wherein the e-mail address is associated with a particular Internet domain name;

determine that the particular Internet domain name is one of the one or more Internet domain names associated with the organization;

responsive to determining that the particular Internet domain name is one of the one or more Internet domain names, send an e-mail to the e-mail address of the user, wherein the e-mail comprises a clickable hyperlink;

determine that the user has clicked the clickable hyperlink using a mobile device that is different from the enrollment system; and responsive to determining that the user has clicked the clickable hyperlink, perform functions to enroll the mobile device in a service plan operated by a mobile network operator associated with the enrollment system.

2. The enrollment system of claim 1, wherein the enrollment system is operating on a first telecommunications network, and wherein the mobile device is operating on a second telecommunications network different from the first telecommunications network.

3. The enrollment system of claim 1, wherein the enrollment system is operating on a telecommunications network, and wherein the mobile device is roaming on the telecommunications network.

4. The enrollment system of claim 1, wherein the service plan is a first service plan, wherein the mobile network operator is a first mobile network operator, and wherein the mobile device is enrolled in a second service plan operated by a second mobile network operator prior to being enrolled in the first service plan.

5. The enrollment system of claim 1, wherein the service plan is a post-paid service plan.

6. The enrollment system of claim 1, wherein the instructions to extract the name of the organization cause the enrollment system to:

perform optical character recognition on the image to identify text within the image; and obtain the name of the organization from the text.

7. The enrollment system of claim 1, wherein the enrollment system and the mobile device communicate via short range wireless communication.

8. At least one non-transitory computer-readable storage medium storing instructions, which, when executed by at least one data processor of a system, cause the system to:

scan, using a camera, an identification document to generate an image of the identification document;

determine a name of an organization displayed by the image;

obtain, from a computer server and based on the name of the organization, one or more Internet domain names associated with the organization;

display a prompt for input from a user of the system;

receive, at the system, the input comprising an e-mail address of the user;

determine that the e-mail address is associated with the one or more Internet domain names;

send an e-mail to the e-mail address of the user;

determine that a hyperlink in the e-mail has been clicked on an electronic device; and perform functions to enroll the user in a service plan operated by a mobile network operator associated with the system.

9. The non-transitory computer-readable storage medium of claim 8, wherein the user is associated with the organization.

10. The non-transitory computer-readable storage medium of claim 8, wherein the instructions to determine the name of the organization cause the system to:

extract a feature vector from the image; and provide, using a machine learning model, the name of the organization based on the feature vector, wherein the machine learning model is trained to determine organizational names displayed by training images.

11. The non-transitory computer-readable storage medium of claim 8, wherein the organization is a university.

12. The non-transitory computer-readable storage medium of claim 8, wherein the identification document is a student visa.

13. The non-transitory computer-readable storage medium of claim 8, wherein the instructions cause the system to generate, using a generative artificial intelligence model and based on the name of the organization displayed by the image, the prompt for the input from the user.

14. The non-transitory computer-readable storage medium of claim 8, wherein the instructions to perform functions to enroll the user in the service plan cause the system to send a message to a computer server operated by the mobile network operator.

15. A method performed by a computer system, the method comprising:

receiving, using one or more computer processors, an image of an identification document;

causing a prompt to be displayed on a screen of an electronic device;

receiving, from the electronic device, an e-mail address associated with a user;

obtaining a name of an organization from the image;

obtaining, based on the name of the organization, one or more Internet domain names associated with the organization;

determining that the e-mail address is associated with the one or more Internet domain names;

sending an e-mail comprising a clickable link to the e-mail address;

determining that the link in the e-mail has been clicked on a mobile device; and sending, to a computer server, a message authenticating an identity of the user.

16. The method of claim 15, wherein the image has been scanned by the electronic device or the mobile device.

17. The method of claim 15, wherein obtaining the name is performed using a machine learning model based on features extracted from the image.

18. The method of claim 15, comprising:

generating, using a generative artificial intelligence model and based on the image, the prompt.

19. The method of claim 15, wherein the electronic device is the mobile device.

20. The method of claim 15, comprising performing functions to enroll at least one of the user, the electronic device, or the mobile device in a service plan operated by a mobile network operator associated with the computer system.

\* \* \* \* \*